United States Patent [19]
Hartman

[11] Patent Number: 5,759,339
[45] Date of Patent: Jun. 2, 1998

[54] RIBBON DISPENSING GUIDE ARM AND POSITIONING DEVICE

[75] Inventor: James N. Hartman, Portland, Oreg.

[73] Assignee: Linear Products Inc. Vancouver, Wash.

[21] Appl. No.: 766,377

[22] Filed: Dec. 12, 1996

[51] Int. Cl.⁶ .................................... B32B 31/00
[52] U.S. Cl. .................. 156/574; 156/470; 156/177; 156/210; 156/523
[58] Field of Search ................... 156/523, 574, 156/577, 176, 177, 178, 179, 205, 210, 306.6, 537, 462, 470

[56] References Cited

U.S. PATENT DOCUMENTS

| | | | |
|---|---|---|---|
| 1,800,179 | 4/1931 | Darrow | 156/177 X |
| 4,398,650 | 8/1983 | Holmes et al. | 156/178 X |
| 4,452,837 | 6/1984 | Clausen . | |
| 4,481,054 | 11/1984 | Clausen et al. | 156/210 X |

OTHER PUBLICATIONS

Tidland, "Upgrading Your Winder Performance".
Linear Products, Inc., Sesame® Tape Dual Guide Beam With Adjustable Guides for the Open-Sesame® Ssytem (LM-5000 Series).
Linear Products, Inc., Sesame® Tape Single Guide Beam With Adjustable Guides (LM-5000 Series) For use with the Model IV Sesame Tape Backstand.
Balluff, "Principles of Operation/Linear Position Transducers," p. H2.

Primary Examiner—James Engel
Attorney, Agent, or Firm—Nancy N. Quan; Carolyn A. Fischer

[57] ABSTRACT

An apparatus for dispensing a ribbon into a web laminating machine including movable guide arms that move transversely to the direction on movement of the webs and include remote repositioning of the arms and locking means to lock the arms in desired spaced relationship along a guide rail.

20 Claims, 6 Drawing Sheets

RIBBON DISPENSING GUIDE ARM AND POSITIONING DEVICE

BACKGROUND OF THE INVENTION

1. Field of the Invention

This invention relates to an improvement in an apparatus for dispensing a ribbon, i.e., tape, web or string, between layers of paper-like web material at the laminating end of a web making machine or the web end of a corrugating machine. One aspect of the present invention is the positioning of novel ribbon dispensing guide arms to locate each guide arm with precision transversely with respect to the web laminating machine path, and doing so remotely.

2. Description of the Prior Art

The commercially available guide arms are not remotely positioned by the use of independent drives for the arms or the use of a digital readout to determine the position of the arm and to afford the proper location of one or more arms across the full width of the guide rail. Previously, the guide arms were mounted on a beam placed in the laminating machine and the beam had to be removed from the machine for any extensive adjustment of the arms. The guide arms then had means for individual adjustment but the amount of movement was limited. Such a machine was earlier commercially available as the LM-5000 Series, Tape Single guide Beam available from the assignee of this application, H.B. Fuller Company (now Linear Products, Inc.) of Vancouver, Wash. USA and sold under the trade name "Sesame" and "Open Sesame".

Further, the space available in the laminating or corrugating machines for the placement of individual remotely adjustable guide arms for the ribbon, tape, web or string, generally referred to herein as "ribbon", used to provide reinforcement or to provide a tear tape for the future package, is generally limited in cross-sectional area, e.g., the area available is generally limited to a right triangular area with the two legs adjacent the right angle being about 8 inches and 16.5 inches (20 cm and 42 cm) respectfully. The area is located between guide rolls for the individual webs being laminated and the double backer rolls where the webs are being placed in intimate contact transversely to the in-machine direction across the entire width of the webs. The webs typically include a liner and a single faced web having flutes on one side thereof extending transversely to the direction of movement of the web. The substrate could alternatively be formed of any number of continuous sheet-like webs, including fabrics (both woven and nonwoven), plastic film, felted materials, foil, etc., particularly Kraft paper, materials used in corrugated board and other water-laid and airlaid paperlike and nonwoven materials. U.S. Pat. No. 4,452,837 issued Jun. 5, 1984 generally discloses a machine of the type associated with the present invention and discloses a system using ribbons pre-coated with a "hotmelt" type of adhesive for providing improved reinforcement of a sheet-like substrate where a plurality of ribbons are fed through a guide member onto a sheet-like web. In this patented device the guide is a reciprocating bar having eyelets for receiving a plurality of ribbons which bar places the ribbons onto the web in a serpentine pattern to provide continuous reinforcement of the substrate in both the machine direction and transversely.

The present invention provides an apparatus and method for precisely placing one or more continuous ribbons on the web, the ribbons extending parallel in the machine direction. A plurality of ribbons would be placed in transversely spaced relationship. Changes in the position of any one or more of the ribbon dispensing guide arms is accomplished remotely of the location of the guide arms on a guide beam. Changes in position of the ribbons is dictated by the use of the substrate in the later manufacture of the bag or carton. The ribbons can be coated with a hot melt type adhesive and bonded to the web during the laminating. Depending on the strength of the ribbon, the same will be a suitable transverse reinforcement of the substrate or serve as a tear strip affording ease in opening the container to be formed from the substrate.

SUMMARY OF THE INVENTION

The present invention is directed to an apparatus for applying a ribbon to a web during the processing of the web, i.e., for the manufacture of a substrate for container construction. The apparatus of the present invention is used to dispense a ribbon onto a web in a predetermined position and to be able to adjust the position of the ribbon with relationship to the edges of the web remotely and readily. The apparatus includes a frame supporting a belt means used to move each guide arm along the frame, locking means to position the guide arm in a desired fixed position along the guide rail, and means for determining the position of the guide arm transversely of the web direction of movement or the machine direction of the web. The frame includes a guide rail. The guide arm is supported on the guide rail for movement therealong. The guide arm includes guide pulleys for receiving a ribbon from a remote supply which is fed to the guide arm transversely of the web and for locating the ribbon on the web for attachment and lamination thereto.

In one embodiment the frame supports a transducer to afford a reading as to the position of the guide arm with respect to the centerline or an edge of the web. The transducer is connected to a control and display box providing a numeric digital readout giving the location along the guide beam of the guide arm or arms. The guide arms are provided with means cooperating with the transducer to afford a signal in response to a current pulse sent from the display box along the transducer. The signal from each arm is discerned by the electronics in the display box to calculate the distance any particular guide arm is from the predetermined "0" and the numeric value is displayed on the screen of the display box.

These and other novel features of the invention will be more fully described hereinbelow.

BRIEF DESCRIPTION OF THE DRAWINGS

The present invention will be described with reference to the accompanying drawing wherein.

DESCRIPTION OF THE PREFERRED EMBODIMENTS

The present invention provides an improved apparatus for the dispensing of a ribbon onto a moving web at a desired path on the web, with the apparatus including at least one ribbon dispensing guide arm independently adjustable transversely of the direction of movement of the web.

Figure 3:
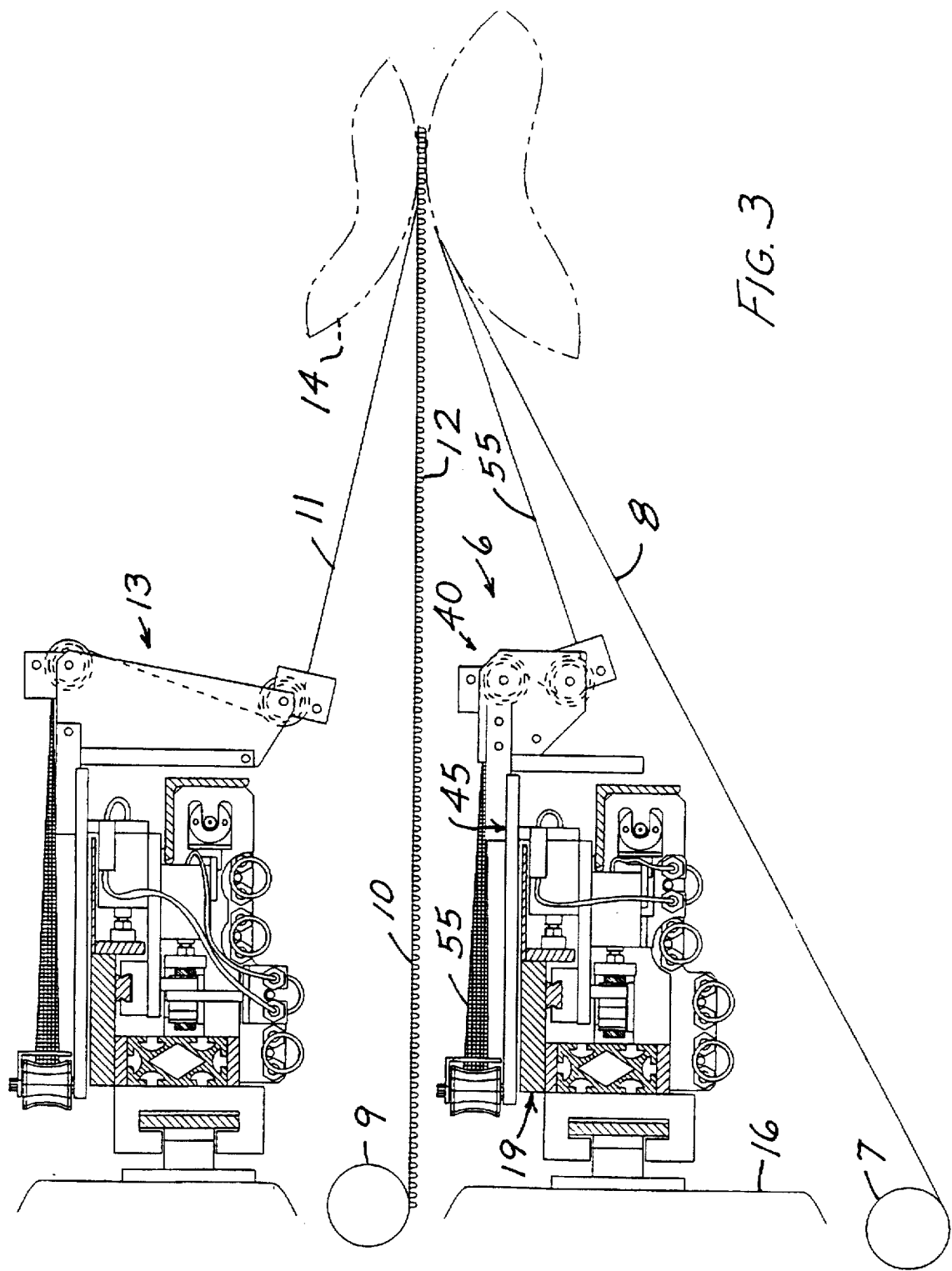
FIG. 3 is a sectional view of a corrugating machine similar to FIG. 2 having two ribbon dispensing apparatus according to the present invention, the second being placed to dispense one or more ribbons from a guide arm on the surface of the single faced web opposite the flutes.

As illustrated in the drawing the apparatus, generally designated 6, is adapted to be positioned in a web laminating machine, e.g., a corrugation machine, within an area generally triangular in cross section defined by a guide roll 7 for a liner or lower web 8, a guide roll 9 for a single face web 10 having flutes 12, and the opposed double backer rolls 14 and 15 that are mounted for rotation about horizontal axes which extend transversely with respect to the in-machine direction across the entire width of liner 8 and web 10. As illustrated in FIG. 3, an apparatus 13, corresponding to apparatus 6, can additionally be mounted above the web 10 to apply a ribbon 11 to the side of the web 10 opposite the flutes 12, and directly aligned with a ribbon 55 positioned between the flutes 12 and the liner 8. The laminate can be die cut to form a pull tab so the superimposed ribbons form a tear tape to sever the laminate along the path of the ribbons when pulled through the liner 8.

Since the apparatus 6 and 13 are similar, except for the position of the ribbon pulleys, only the construction of ribbon dispensing apparatus 6 will be further described.

A frame member 16 on the corrugating machine supports a track 18 on which an apparatus frame 19 of the ribbon dispensing apparatus 6 is mounted by a plurality of support rollers, including transverse rollers 20, supported in brackets 22. The support rollers, six in all in each bracket 22, engage the top (rollers 20), bottom and opposite faces of the track 18, one above and one below the center line of track 18 on each side. All of the support rollers are not shown but allow for the insertion and removal of the apparatus 6 in relationship to the right-triangular area defined above in a corrugating machine. A suitable positioning means on the machine frame 16 and on the apparatus frame 19 locate the apparatus frame 19 on the corrugating machine.

Figure 5:
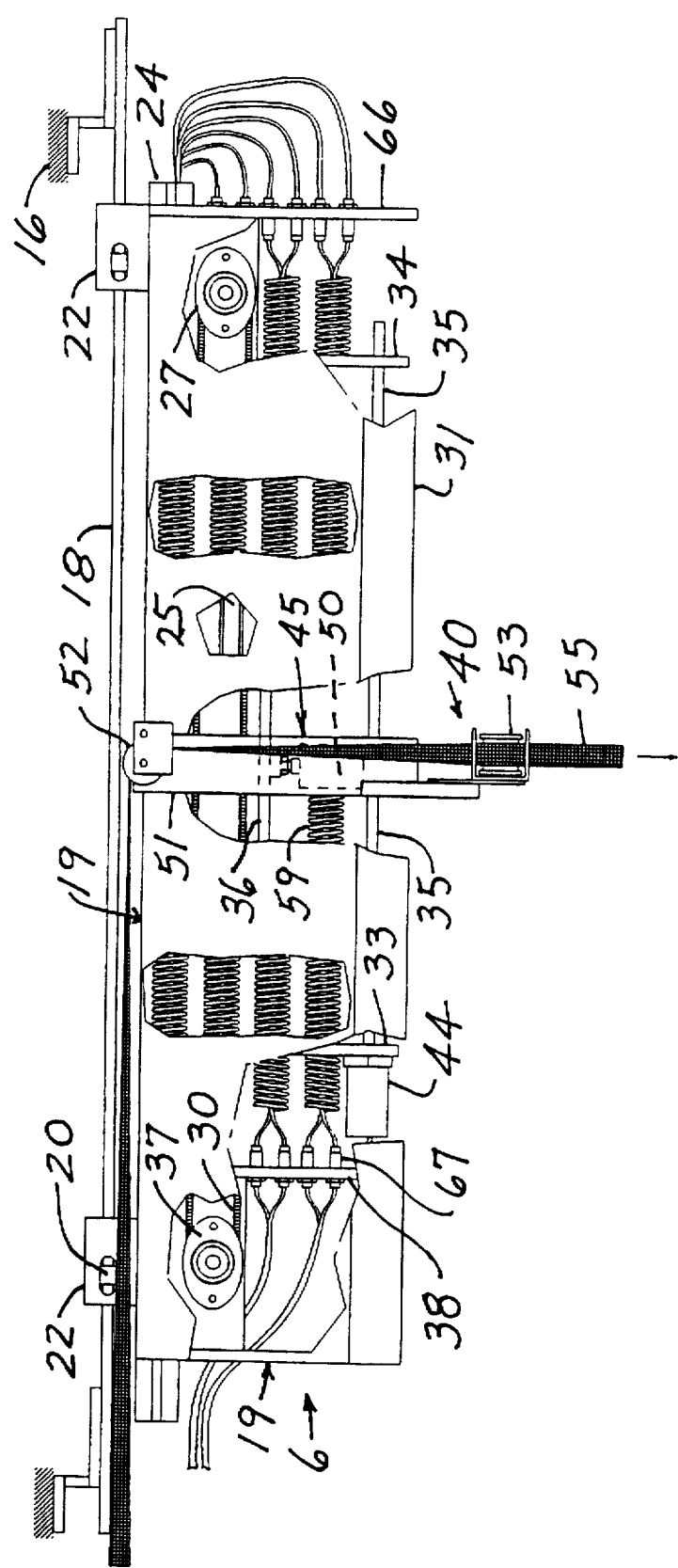
FIG. 5 is a plan view of the apparatus.

The apparatus frame 19 includes a bearing or guide rail 25, which is approximately 2500 mm in length and is supported beneath an upper frame member 26, supported from a hollow rectangular extruded support member 24 positioned between two flat bars, which support member 24 also supports the brackets 22. Frame member 26 supports an adjustable belt guide, generally designated 27, including bearing mounts, and an adjustable support bar (see FIG. 1) for the bearing mounts (see FIG. 6), and a belt idler pulley 28. Bearing mounts 37 are provided at the other end of the apparatus frame 19 for mounting a capstan 29 affording drive means for an endless drive belt 30 extending around the adjustable idler pulley 28 and the capstan 29. The apparatus frame 19 further includes an angle frame member 31 and transducer mounting plates 33 and 34 (see FIG. 5) mounted adjacent opposite ends of the frame 19. A linear transducer 35 is supported by the plates 33 and 34. The transducer is held in the plates 33 and 34 by thermal insulative bushings. Further, the frame 19 has a guide rail 25 supported below the frame member 26 and a braking bar 36 extending from an edge of the member 26. A cover, including a cover sheet 32 having a thickness of about 3.2 mm and a width of about 89 mm, covers the frame 19 from the frame member 26 to the edge of the angle member 31.

Figure 1:
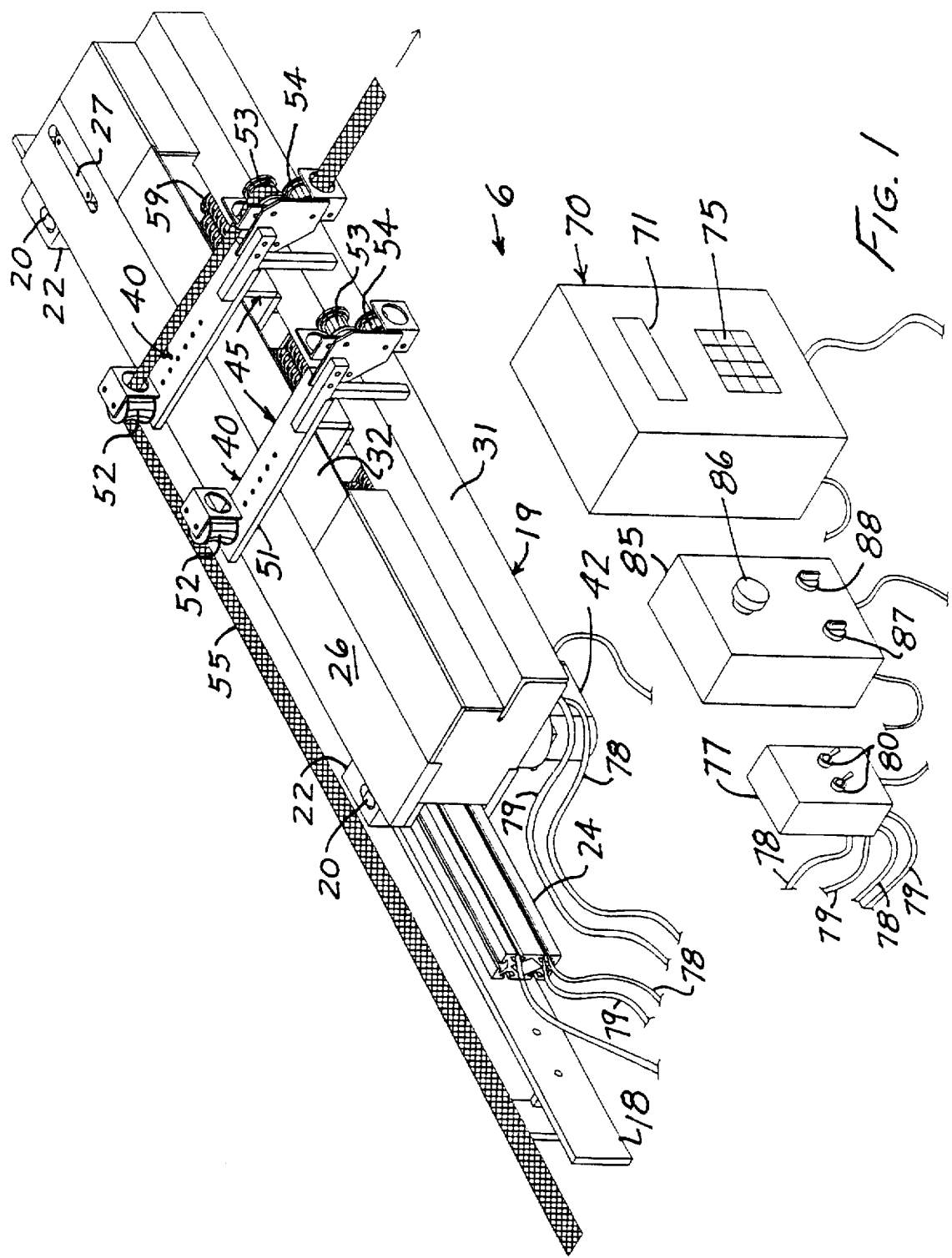
FIG. 1 is a perspective view diagrammatically showing the apparatus frame for mounting on the frame of a corrugating machine, a pair of ribbon guide arms, and the remote display panel and control boxes, with connecting parts broken away.
Figure 2:
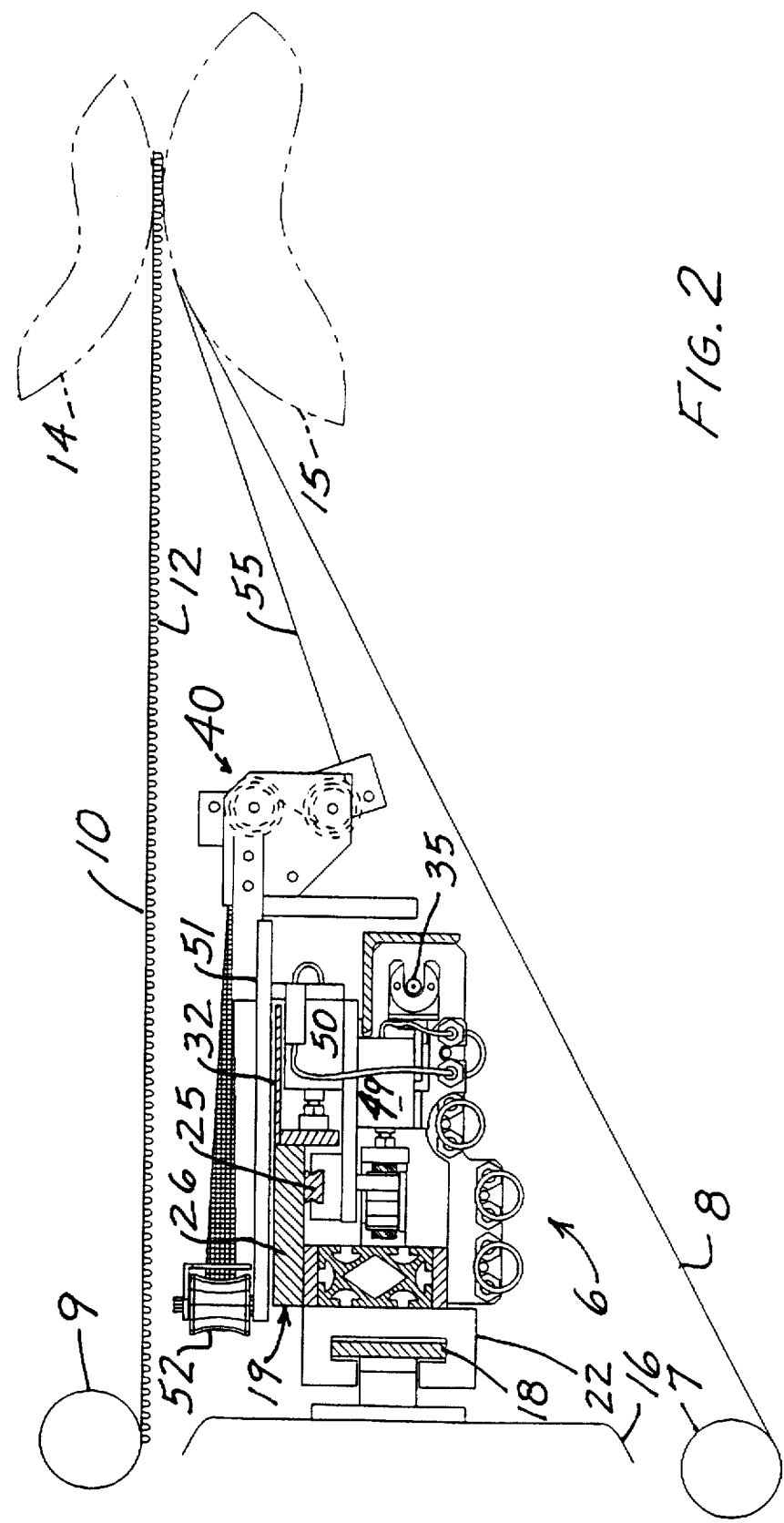
FIG. 2 is a sectional view of the apparatus at the position of a guide arm in a corrugating machine and showing the frame, guide beam and guide arm assembly.
Figure 6:
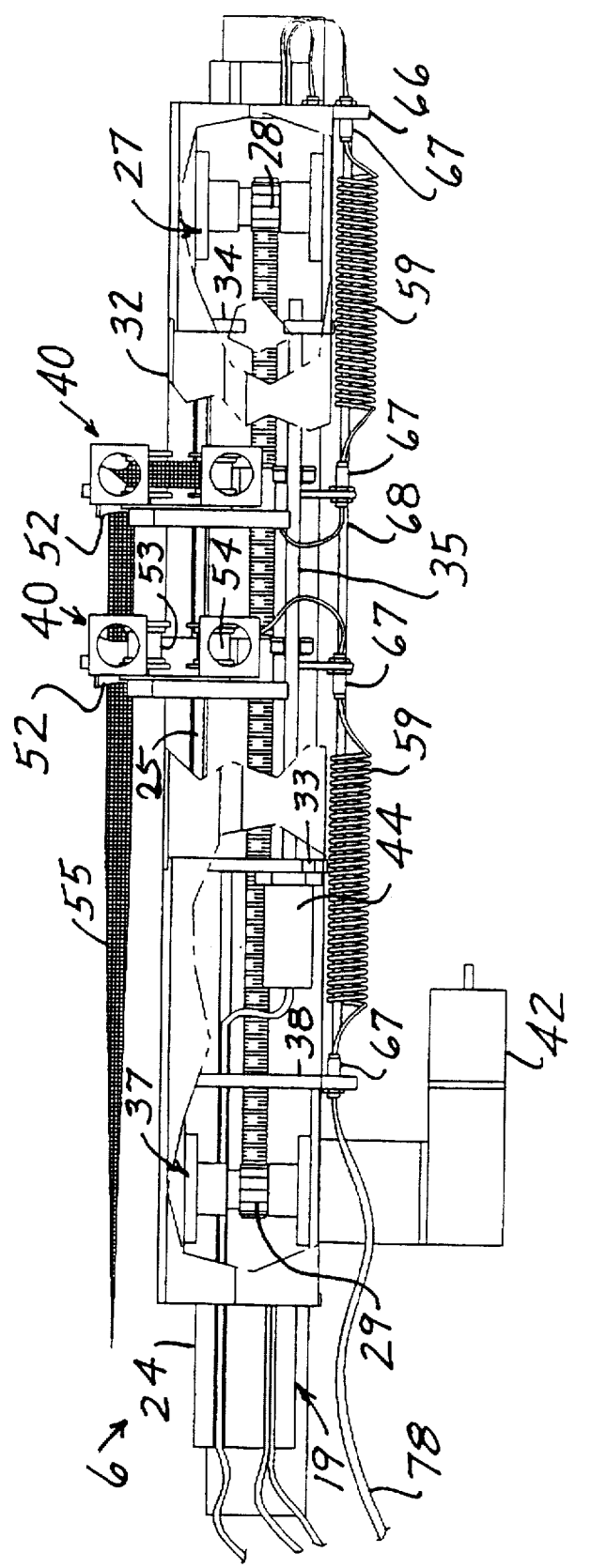
FIG. 6 is a front elevational view of the apparatus illustrating the guide beam and dispensing guide arm.

A ribbon dispensing guide arm 40 is an assembly mounted on the frame 19 for movement in relationship thereto. While only one guide arm 40 is illustrated in most views of the drawing for purposes of simplicity, a plurality of guide arm assemblies 40 are illustrated in FIGS. 1 and 6. A complete system would incorporate 6 to 8 guide arms 40 of identical configuration spaced along the guide rail 25 and spaced transversely along the frame 19 and of the machine direction of the moving webs 8 and 10.

The idler belt guide 27 supports the endless drive belt 30, of the type used for timing belts, and the belt 30 is driven by the capstan 29 to move along the path between the capstan 29 and pulley 28 at opposite ends of the frame 19. Drive means in the form of a variable speed reversible electric motor 42, having a right angle reducer and adapter for connection to the drive shaft of the capstan 29, as illustrated in FIG. 6, rotates the capstan 29, clockwise or counterclockwise, to drive the belt 30 along the path. An alternative drive may be a hand crank but the control circuit allows remote control of the motor 42.

The transducer 35 has an electronic head 44 (see FIGS. 5 and 6) positioned adjacent to the support plate 33. The transducer head 44 is connected to a control box 70, having a display panel 71 and circuitry associated therewith, to identify the position of each of the dispensing guide arms 40 as further described herein.

The guide arms 40, one of which is described, comprise a support frame, generally designated 45, having a bracket 46 supporting a linear bearing 48 riding on the guide rail 25 and supporting two pneumatic cylinders 49 and 50, and an upper bracket 51 supporting a plurality of guide pulleys 52.53 and 54 for the ribbon 55. Also, the frame 45 supports a permanent magnet 56 which is attached to each guide arm 40. The permanent magnet 56 substantially surrounds the transducer 35 and is supported from an angle bracket 57 connected to the frame 45 adjacent to the rear of the pneumatic cylinder 49. The drive cylinder 49 is actuated by pneumatic pressure to force a rubber bumper 60 toward the drive belt 30, forcing the belt against a backup bar 61 extending from the bracket 46. The cylinder 49 is pneumatically operated and is returned to the normal position by a return spring. The cylinder 50 is the locking cylinder which is normally activated by a source of pneumatic pressure through a pneumatic pressure supply line to drive a rubber bumper 64 against a brake bar 36 on the frame 19 of the apparatus 6 near the guide rail 25 for locking the guide arm 40 in position to the frame 19. This lock for the guide arm 40 is normally applied and upon removal of the pneumatic pressure in the cylinder 50, the bumper 64 is separated from the brake bar 36 by a return spring in and for the pneumatically operated cylinder 50 operating the bumper 64.

Figure 4:
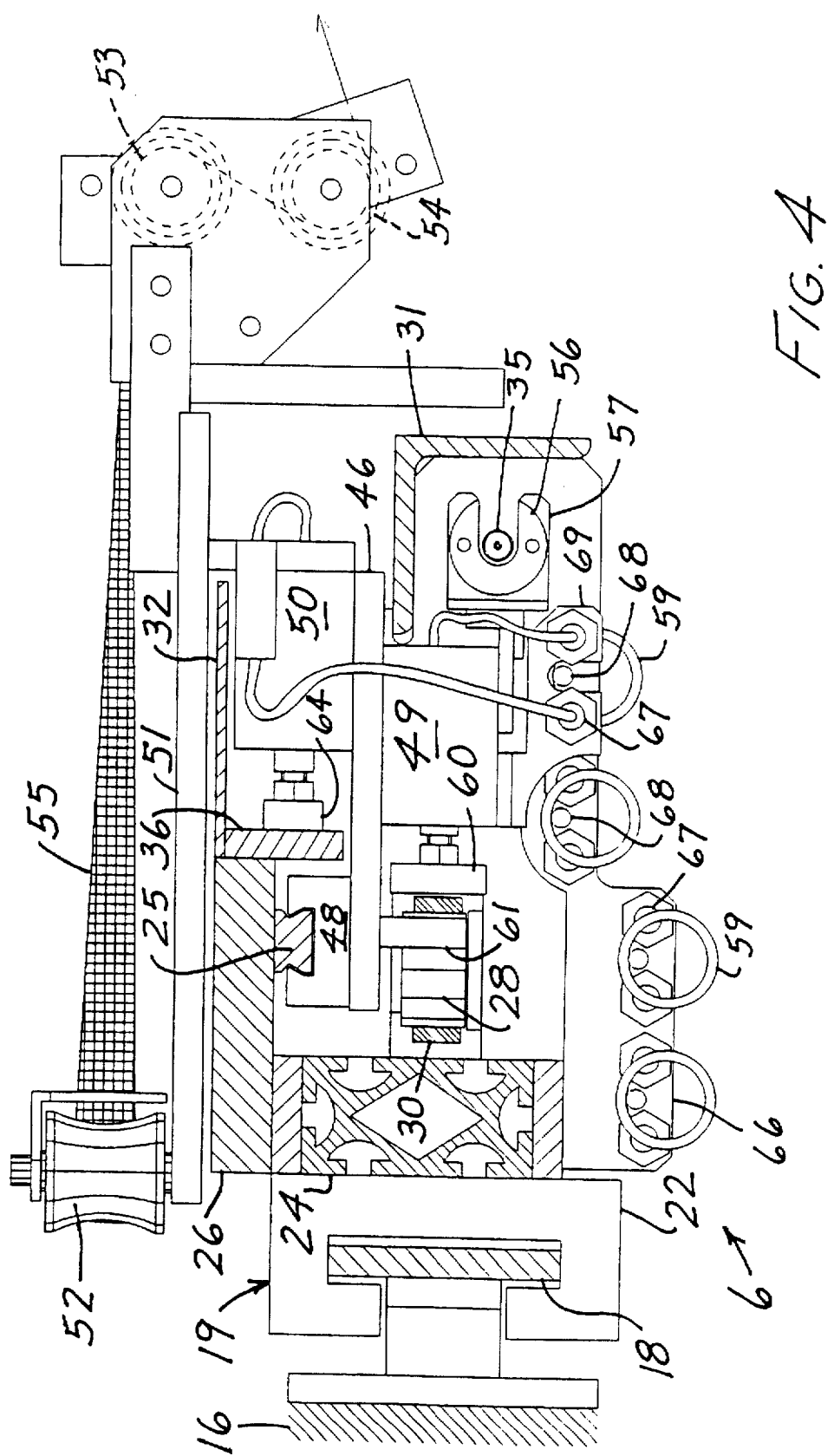
FIG. 4 is an enlarged sectional view of the apparatus showing the frame, its support, and the ribbon guide arm assembly, including the locking and positioning members in greater detail.

The Figures of the drawing illustrate a plurality of helical coiled pneumatic hoses 59 supported in the frame 19. Each of the hoses 59 include a pair of pneumatic lines affording one line for each cylinder 49 and 50 of a guide arm assembly 40. Pneumatic pressure from a source supplies pressure to the hoses 59 via a valve control unit 77 and lines 78 and 79, two pairs of which are illustrated in FIG. 1 leading from a unit 77 having two toggle switches 80 for the two guide arm assemblies 40 illustrated. One pair of the lines 78 and 79 are connected to a support plate 38, positioned adjacent to the stepping motor 42 and transducer head 44, by push-lock bulk-head fittings 67. The second pair of lines 78, 79 are illustrated in FIG. 1 as threaded through the extruded beam 24 and they are connected to a frame end plate 66 by push-lock bulk-head fittings 67. The fittings 67 are then connected on the opposite side of the plates 38 and 66 to the helical coiled sections of hose 59. The other helical coiled hoses 59 illustrated in FIGS. 2, 3, 4 and 5, and connected to the plates 66 and 38, would be similarly connected to fittings and supply lines corresponding to lines 78 and 79 for other guide arm assemblies 40. The coiled hoses 59, comprising two individual pneumatic lines, are supported on guide rods 68 extending between the support plate 38 and end plate 66. An end of each coiled hose 59 is connected to a bulk-head fitting 67 on a plate 69 of the assembly frame 45 of a ribbon guide arm 40 and lines extend from fittings thereon to the cylinders 49 and 50 of the ribbon guide arm 40, respectively, as best shown in FIG. 4. The line leading to cylinder 49 goes from the fitting 67 to the rear of the cylinder 49. The line for cylinder 50 extends from the fitting 67, through a guide and into the back of the cylinder 50. Note that the plate 69 is formed with an arcuate or slotted opening to allow it to move with the coiled hose 59 along the rod 68, similar to the way the magnet 35 and bracket 57 move along the transducer 35 without interference.

The guide pulley 52 on each guide arm is the entrance pulley for the ribbon 55 entering the guide arm 40. The ribbon 55 is rotated 90° from pulley 52 to engage pulley 53 on a horizontal shaft to direct the ribbon 55 to a dispensing pulley or exit pulley 54. From the pulley 54 the ribbon 55 is applied to the liner 8. In FIG. 3 the ribbon from the guide arm assembly of apparatus 13, above the single sided web 10 is directed to the side of the web 10 opposite the flutes 12. On each guide arm assembly 40 the pulley 52 is adjusted along the upper bracket 51 as shown in FIG. 1 to stagger the incoming ribbons.

In operation, the locking cylinder 50, on all guide arms 40, will be extended with the bumper 64 gripping the brake bar 36. When one or more of the arms 40 need to be moved to a new position, the appropriate toggle switch 80 for that arm is operated. Then the drive cylinder 49 is activated to drive the bumper 60 against the drive belt 30, and the belt 30 against the backup bar 61, to lock the frame 45 of the guide arm 40 to the drive belt 30 to be moved thereby. The bumper 64 of the locking brake cylinder 50 for that arm is retracted after some slight time delay. The drive belt 30 is operated by the motor 42 controlled by the motor control 85 having an on-off power button 86 and forward 87 and reverse 88 speed control knobs. The portion of the belt 30 between the capstan 29 and the idler pulley 28, and facing the bumpers 60, is then reciprocatable depending on the direction of movement desired, via the direction of rotation of the capstan 29 by the drive means. When the particular arm 40 reaches the correct position, the valves 80 are toggled in the other direction and the locking cylinder is extended, and the drive cylinder is retracted from the drive belt 30.

In order to move an arm to another location, the initial position of the arm must be known. The electronic control box 70 allows the operator to find the current position of any one guide arm assembly 40 by pressing several function keys 75 on the key pad of the control box 70. A numeric digital readout is displayed in the display panel 71. As the guide arm 40 is moved along the guide rail to a new position, the numeric readout continuously displays the updated location. When the operator sees the display readout reach the correct numeric value, the drive means is stopped and the toggle switch moved to lock the guide arm 40 in position.

The transducer and control box operation allows an operator to press the function keys 75 to see the location of any one guide arm 40. The control circuitry triggers the transducer to send a current pulse down a wire held inside the linear transducer rod 35. The current in the wire creates an electric field about the wire. When the current flowing down the wire reaches the arm 40 in question, the electric field of the wire interacts with the magnetic field of the permanent horse-shoe magnet 56 on the guide arm 40. This interaction creates a torque in the wire producing a signal by the arm. The electronics of the transducer head calculates how long in time it was from when the current pulse was sent down the wire to when the reaction signal in the wire is sensed. From this information, position of the arm is discerned and the distance is calculated from the preset "0" and the numeric value is displayed. The electronics are designed to discern which magnet to read the electric field-magnetic field location signal from. The operator then has a precise position/location reading and can adjust the arm as necessary, in the manner described above. The display control box 70 and circuitry for positioning the dispensing guide arms 40 are available from Carolina Motion Control, Inc. of Garner, N.C. A suitable item being the MTI-400 or MTI-800 multiple transducer interface. The transducer 35 and electronic head 44 are a magnetostrictive transducer. The magnetostrictive element is an extremely small diameter (I.D. less than 0.0125 inch, i.e., 0.31 mm) Ni-Fe alloy tube held in place inside a protective outer tube forming a waveguide. This waveguide runs the length of the transducer 35. To initiate a measurement for position update, a circuit in the control box 70 has the head 44 pulse a current on a conductor wire which has been threaded coaxially through the waveguide. During the short time that this pulse is on, a rotating electromagnetic field surrounds the waveguide. At the same time, lines of field from magnets 56 in the guide arms 40 focus on the waveguide. The effect of these two fields is to generate a magnetostrictive strain wave just below the magnets producing a signal which ripples back down the waveguide to a receiver in the transducer head 44. This mechanical pulse is converted into an electrical signal. The high-speed clock or an integrator measures the time between launching the current pulse and arrival of the torsional wave. Since the velocity of the torsion pulse is known as a material integrator, the distance will be known. The accuracy of the device to know the position of the guide arm 40 has a resolution of 2.5 um (0.0001 inch). Such systems are available from Balluff, Inc. of Florence, Ky.

Having described the invention with reference to accompanying illustrations of the apparatus of the present invention, it is contemplated that engineering changes can be made without departing from the spirit or scope of the invention as set forth in the appended claims.

I claim:

1. An apparatus for the positioning of a dispenser for laminating an endless ribbon in relationship to a moving web, said apparatus comprising:

a) a frame extending transversely of the path of a said web;

b) movable belt means supported by said frame for movement along a predetermined path;

c) guide rail means supported by said frame and positioned parallel to the path of said belt means for supporting a guide arm having means for dispensing a said ribbon;

d) said guide arm having means for supporting the guide arm on said guide rail means, releasable locking means for locking said guide arm to said frame for holding the guide arm in position on said guide rail means, and means for releasing said locking means and for connecting said guide arm to said belt means for movement therewith along said frame and guide rail means.

2. An apparatus according to claim 1, wherein said releasable locking means includes a pneumatic cylinder with a bumper which is pressed against said frame.

3. An apparatus according to claim 1 wherein said means for connecting said guide arm to said belt means comprises a cylinder making a connection to said belt means to move said guide arm upon movement of said belt means along said path.

4. An apparatus according to claim 1 wherein said guide arm comprises a bracket having a bearing supported on said rail, a cylinder supported by said bracket to form said releasable locking means, and a cylinder for making connection to said belt means for movement of the guide arm with said belt means.

5. An apparatus according to claim 1 wherein said frame comprises means for driving said belt means along said path.

6. An apparatus according to claim 4 wherein said frame comprises means for moving said belt means along said path.

7. An apparatus according to claim 1 wherein said frame comprises a transducer extending along said frame, and said guide arm comprises a permanent magnet positioned adjacent to said transducer to serve as a signal generator when an electric field is formed in said transducer.

8. An apparatus according to claim 1, wherein said means for dispensing a said ribbon from said guide arm includes a bracket supporting a plurality of pulleys to guide a said ribbon from a supply to a position juxtaposed to a said moving web.

9. In a paper laminating machine according to claim 1 wherein said guide arm comprises a bracket having a bearing supported on said rail, a cylinder supported by said bracket to form said releasable locking means, and a cylinder for making connection to said movable means for movement of the guide arm with said movable means.

10. An apparatus for use in the positioning of a dispenser for laminating an endless ribbon in relationship to a moving web in the desired position transversely of the direction of movement of a said web, said apparatus comprising:

a) a frame adapted to be supported transversely of the path of a said web;

b) movable belt means supported by said frame for movement along a predetermined path, means for driving said belt means along said path;

c) guide rail means supported by said frame and positioned parallel to the path of said belt means for supporting a ribbon dispensing guide arm;

d) said guide arm including a bracket supported on and transversely to said guide rail means, said bracket supporting a plurality of pulleys for guiding a ribbon from one end of the bracket to the exit end, supporting locking means for locking said bracket to said frame, and for supporting drive means for connecting said bracket to said belt means for movement of said guide arm along said rail means; and e) remote means on said frame and guide arm for use in identifying the position of a said guide arm and for releasing said locking means and actuating said drive means for moving a guide arm from one position along said rail means to another desired position.

11. An apparatus according to claim 10 wherein said remote means comprises a transducer extending along the frame and an electronic head for sending a current pulse along said transducer, and a magnet on said guide arm located adjacent to said transducer for generating a signal in said head upon a said current reaching said magnet.

12. An apparatus according to claim 10 wherein said means for driving said belt comprises an electric motor.

13. An apparatus according to claim 10, wherein said releasable locking means includes a pneumatic cylinder with a bumper which is pressed against said frame.

14. An apparatus according to claim 13 wherein said means for connecting said guide arm to said belt means comprises a cylinder making a connection to said belt means to move said guide arm upon movement of said belt means along said path.

15. An apparatus according to claim 10 wherein said guide arm comprises a bracket having a bearing supported on said rail, a cylinder supported by said bracket to form said releasable locking means, and a cylinder for making connection to said belt means for movement of the guide arm with said belt means.

16. An apparatus according to claim 10 wherein said frame comprises means for driving said belt means along said path.

17. An apparatus according to claim 15 wherein said frame comprises means for moving said belt means along said path.

18. In a paper laminating machine having a machine frame, a pair of ribbon dispensing apparatus disposed on opposite sides of a path of a web moving through the paper laminating machine to place the ribbons in aligned opposed positions on the web, said apparatus each comprising:

a) a frame extending transversely of the path of a said web;

b) movable means supported by said frame for movement along a predetermined path;

c) guide rail means supported by said frame and positioned parallel to the path of said movable means for supporting a guide arm having means for dispensing a said ribbon;

d) said guide arm having means for supporting the guide arm on said guide rail means, releasable locking means for locking said guide arm to said frame for holding the guide arm in position on said guide rail means, and means for releasing said locking means and for connecting said guide arm to said movable means for movement therewith along said frame and guide rail means.

19. In a paper laminating machine according to claim 18, wherein said releasable locking means includes a pneumatic cylinder with a bumper which is pressed against said frame.

20. In a paper laminating machine according to claim 18 wherein said movable means is an endless belt and said means for connecting said guide arm to said movable endless belt means comprises a cylinder making a connection to said endless belt means to move said guide arm upon movement of said endless belt means along said path.

* * * * *